May 30, 1961     J. F. GRIMM     2,986,640

RADIATION METER

Filed Feb. 10, 1958

INVENTOR.
JOHN F. GRIMM

BY Eyre, Mann & Lucas

ATTORNEYS

United States Patent Office 2,986,640
Patented May 30, 1961

2,986,640

RADIATION METER

John F. Grimm, Newark, N.J., assignor to Tung-Sol Electric Inc., a corporation of Delaware Filed Feb. 10, 1958, Ser. No. 714,128

5 Claims. (Cl. 250—83.6)

This invention relates to a radiation meter for determining the intensity of ionizing radiation. It has particular reference to a radiation meter which is independent of the voltage supplied within a wide range of values and which can be easily tested in the field.

Many forms of radiation meters have been designed for measuring the intensity of X-rays, gamma rays, and other forms of penetrating radiation. Most of these measuring systems require an accurately adjusted voltage or a current which is within a narrow restricted range. Such systems can be handled easily in a laboratory where trained personnel are available for the adjustment and measurement. However, for workers in the field, such precise systems require too much time and too much effort for obtaining the required results. The present invention requires no batteries, although batteries may be used, and operates on a wide range of direct current voltages. The invention includes a simple zero adjusting device which enables a worker in the field to make preliminary adjustments.

As used throughout the specification and claims, the terms "penetrating radiation" and "ionizing radiation" refer to cosmic rays, X-rays, gamma rays, alpha rays, beta rays, and streams of neutrons. All the above kinds of radiation are capable of producing ionization in ionization chambers.

One of the objects of this invention is to provide an improved radiation meter which avoids one or more of the disadvantages and limitations of prior art meters.

Another object of the invention is to reduce the weight of a radiation meter so that it can be worn on the clothing or carried in the pocket.

Another object of the invention is to increase the range of radiation meters so that they may be used for a longer time without replacement of parts.

Another object of the invention is to permit an accurate determination of radiation even though the applied voltage varies within wide limits.

Another object of the invention is to permit an observer in the field to check the zero reading of the measuring instrument by a simple operation.

The invention includes a radiation meter for measuring the intensity of ionizing radiation and includes a source of direct current power which may be a charged condenser, an ionization chamber, a constant current component connected across said chamber, a high resistor connected in series between the source of potential and said chamber and constant component, and an electrostatic voltmeter connected across the terminals of said resistor.

One feature of the invention includes a disconnect switch in series with the ionization chamber and provides an immediate check in the field to determine whether or not the zero reading is correct.

Another feature of the invention includes a constant current device which may be adjusted to pass small currents having a ratio of three to one. This adjustment is used for zeroizing the instrument.

For a better understanding of the present invention, together with other and further objects thereof, reference is made to the following description taken in connection with the accompanying drawings.

Figure 1:
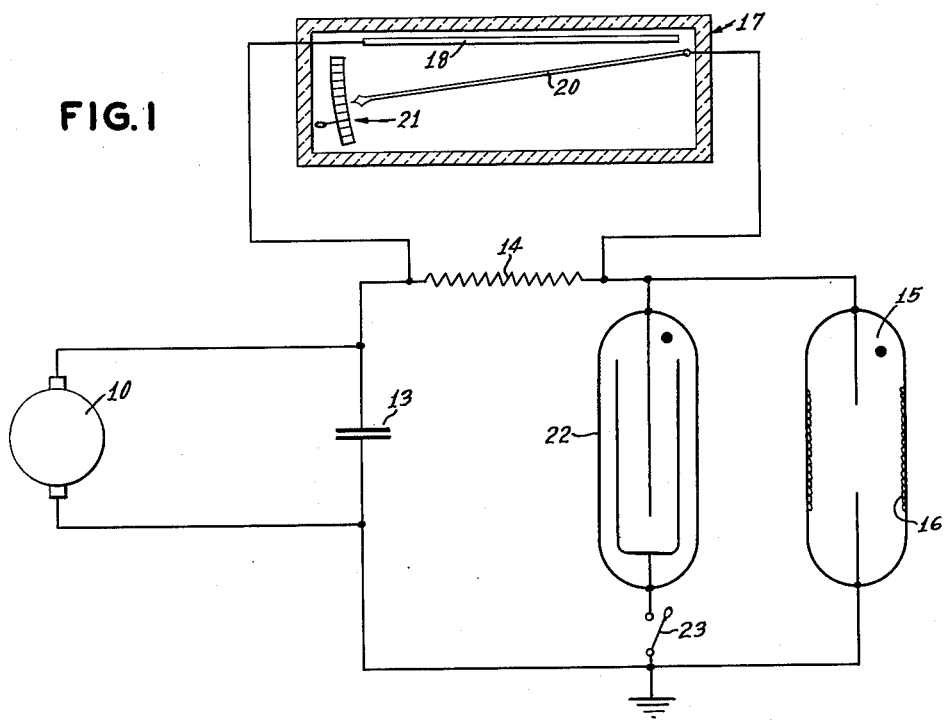
Fig. 1 is a schematic diagram of connections showing all the components of the radiation meter.

Referring now to the drawings, the schematic diagram shows a generator 10 which may be a battery or any other form of potential source connected to a storage capacitor 13. It will be obvious that the generator 10 may be omitted and a high potential battery substituted for capacitor 13. The capacitor is connected in series with a high resistor 14 and a constant current component 15, generally called a "curpistor." This device is gas-filled and has two electrodes within a sealed container and in addition a quantity of radioactive material 16 is deposited somewhere on the inside of the container so that its emanations will produce a constant ionization of the gas molecules within the envelope and therefore permit a constant current to pass between electrodes even though the applied voltage may vary between wide limits. One such constant current component comprises a small glass cylinder which passes a current of $10^{-10}$ amperes even though the applied voltage across its terminals varies between 20 and 400 volts.

An electrostatic voltmeter 17 is connected across resistor 14. This voltmeter may be made in a number of ways, one embodiment being a closed container from which the air has been exhausted and includes a stationary electrode 18. A movable electrode 20 mounted at one end indicates the applied voltage on a scale 21 by its position relative to the stationary electrode 18, such movement being caused by the electrostatic force existing between electrodes 18 and 20. This is a well known device and has been used in many forms of radiation meters and dosimeters, some forms being very small and observed only through a microscope.

An ionization chamber 22 is connected across the terminals of the constant current component in series with a manually operated switch 23. This ionization chamber is similar to many that have been used in the past for detecting penetrating radiation and comprises an envelope containing gas and two electrodes.

Figure 2:
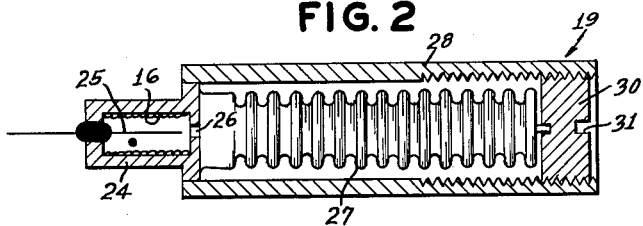
Fig. 2 is a cross sectional view of one form of variable constant current component.

The constant current component 15 as shown in Fig. 1 can not be varied. However, it is an advantage to include a variable constant component in order to compensate for small errors or variations in the resistance of resistor 14, the calibration of voltmeter 17, and the variable characteristics of ionization chamber 22. A variable device 19 is shown in Fig. 2 and illustrates one form of a constant current device for adjusting the current through it. This variation is accomplished by changing the gas pressure by means of a collapsible bellows. Another form of variable constant current device is shown and described in the patent issued to M. H. Shamos, 2,700,110, issued January 18, 1955. The present and preferred device includes a metal chamber 24 having radioactive material 16 deposited upon its interior surface. A wire electrode 25 is axially supported within the container and connected to a lead-in conductor for connection to an external circuit. At one end of the container 24 a small hole 26 is provided which communicates with the interior of a collapsible bellows 27 housed on the inside of a supporting cylinder 28. A portion of cylinder 28 is threaded on its inner surface and a threaded plug 30 is positioned within cylinder 28 making contact with one end of bellows 27. In order to change the pressure within cylinder 24 plug 30 is adjusted by means of a screwdriver which is fitted into a slot 31 and the bellows may be compressed or expanded to change the pressure within container 24 over a three to one range. It is well known that when the pressure of a gas within a closed container is changed the amount of ionization due to incident radiation is also varied, the higher the pressure the greater the ionization within a wide range of pressure values.

Figure 3:
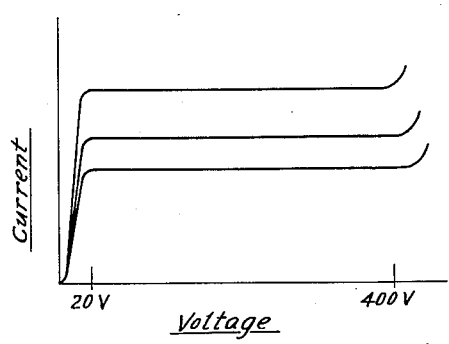
Fig. 3 is a graph showing the relationship between current and voltage of the constant current device shown in Fig. 2.

The graph shown in Fig. 3 illustrates the constant current characteristics of a "curpistor" with different gas pressures. It will be noted that the current is constant for applied voltages which range between 20 and 400 volts. For values less than 20 volts the curernt is not saturated and for values greater than 400 volts the electrons within the ionized gas attain a speed which is sufficient to ionize other molecules.

The operation of this device is as follows: The generator 10 is operated to produce about 500 volts and charge capacitor 13 to that value. The radiation meter may now be adjusted to zero. First, with switch 23 open, the "curpistor" 15 is adjusted until the indicating electrode 20 reads zero in meter 17. This zero reading means that the capacitor 13 is discharging a constant current through component 15 and resistor 14, this current being of the order of $10^{-10}$ amperes and producing a voltage of about 100 volts across resistor 14 which has a value of $10^{12}$ ohms. This represents the conditions when no penetrating radiation is received. Switch 23 is now closed and the meter may be taken into the field and used to measure radiation, any ionizing radiation incident upon chamber 22 then produces an additional current through that portion of the circuit and when added to the current already passing through resistor 14 will produce an additional reading on scale 21, this added reading being proportional to the incident radiation.

The following circuit constants may be used in the circuit shown in Fig. 1 and are illustrative of a specific application of the invention.

| | | |
|---|---|---|
| Capacitor 13 | microfarads | .01 |
| Resistor 14 | ohms | $10^{12}$ |
| Voltage on capacitor 13 | volts | 160 to 500 |
| Current through "curpistor" 15 | amperes | $15-10^{-10}$ |
| Electrostatic voltmeter range | volts | 100 to 160 |
| Ionization chamber | roentgens per hr | 0 to 200 |

The foregoing disclosure and drawings are merely illustrative of the principles of this invention and are not to be interpreted in a limiting sense. The only limitations are to be determined from the scope of the appended claims. The novel constant current device disclosed in Fig. 2 is not claimed herein as it forms the subject matter of another application of the applicant.

I claim:

1. A radiation meter for measuring the intensity of ionizing radiation comprising: a source of direct current power; an ionization chamber; a constant current component connected across said chamber; said component including an envelope, an ionizable gas within the envelope, two electrodes, and a quantity of radioactive material which causes ionization of the gas; a high resistor connected in series between said power source and said chamber; and a voltmeter connected across said resistor.

2. A radiation meter for measuring the intensity of ionizing radiation comprising: a source of direct current power; an ionization chamber including two electrodes and an ionizable gas; a constant current component connected across said chamber; said component including an ionizable gas, two electrodes, and a quantity of radioactive material so positioned as to ionize the gas between the electrodes; a high resistor connected in series between said power source and said chamber; and a voltmeter connected across said resistor.

3. A radiation meter for measuring the intensity of ionizing radiation comprising: a capacitor with connections for charging it to an approximate potential; an ionization chamber and a resistor connected in series with said capacitor; a constant current component connected across said chamber; said component including an ionizable gas, two electrodes, and a quantity of radioactive material so positioned as to ionize the gas between the electrodes; and an electrostatic voltmeter connected across said resistor for producing an indication of the curernt passing through the resistor.

4. A radiation meter for measuring the intensity of ionizing radiation comprising: a series circuit which includes a chargeable capacitor, a resistor, and a constant current component; said component including an ionizable gas, two electrodes, and a quantity of radioactive material so positioned as to ionize the gas between the electrodes; an ionization chamber in series with a switch connected across said component; said chamber including two electrodes and an ionizable gas and arranged to pass current only when receiving ionizing radiation; and an electrostatic voltmeter connected across said resistor.

5. A radiation meter as set forth in claim 4 wherein said constant current component is adjustable to change its constant current value by changing the pressure of the gas.

References Cited in the file of this patent

UNITED STATES PATENTS

| | | |
|---|---|---|
| 2,523,287 | Friedman | Sept. 26, 1950 |
| 2,676,270 | Lahti | Apr. 20, 1954 |
| 2,700,110 | Shamos | Jan. 18, 1955 |
| 2,833,932 | Constable et al. | May 6, 1958 |